US012463390B2

(12) United States Patent
Kirschner

(10) Patent No.: US 12,463,390 B2
(45) Date of Patent: Nov. 4, 2025

(54) PLUG CONNECTOR AND PLUG CONNECTOR SYSTEM

(71) Applicant: MD ELEKTRONIK GmbH, Waldkraiburg (DE)

(72) Inventor: Thomas Kirschner, Egglkofen (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 345 days.

(21) Appl. No.: 18/167,101

(22) Filed: Feb. 10, 2023

(65) Prior Publication Data

US 2023/0268700 A1 Aug. 24, 2023

(30) Foreign Application Priority Data

Feb. 22, 2022 (DE) ..................... 10 2022 104 151.4

(51) Int. Cl.

| | |
|---|---|
| ***H01R 24/40*** | (2011.01) |
| ***H01R 13/11*** | (2006.01) |
| ***H01R 103/00*** | (2006.01) |

(52) U.S. Cl.

CPC ............ *H01R 24/40* (2013.01); *H01R 13/11* (2013.01); *H01R 2103/00* (2013.01)

(58) Field of Classification Search

CPC .... H01R 24/40; H01R 13/11; H01R 2103/00; H01R 13/6582; H01R 13/585; H01R 13/639

See application file for complete search history.

(56) References Cited

U.S. PATENT DOCUMENTS

| | | | | |
|---|---|---|---|---|
| 7,070,440 | B1 | 7/2006 | Zerebilov et al. | |
| 8,597,050 | B2 * | 12/2013 | Flaherty ............ | H01R 13/6277 439/578 |

FOREIGN PATENT DOCUMENTS

| | | | |
|---|---|---|---|
| CN | 105390843 | A | 3/2016 |
| DE | 102012103259 | A1 | 10/2013 |
| EP | 3930110 | A1 | 12/2021 |
| JP | 2017098103 | A | 6/2017 |
| WO | WO 2017144072 | A1 | 8/2017 |
| WO | WO 2018197641 | A1 | 11/2018 |

* cited by examiner

*Primary Examiner* — Briggitte R. Hammond

(74) *Attorney, Agent, or Firm* — LEYDIG, VOIT & MAYER, LTD.

(57) ABSTRACT

A plug connector for transmitting high-frequency signals includes an inner-conductor and an outer-conductor contact, and an insulator arranged therebetween. A receptacle is formed by the outer-conductor contact and is configured to receive a mating plug connector to establish a connection. A catch basket is: formed by the outer-conductor contact, and/or arranged in the receptacle and is configured to produce contacting between the outer-conductor contact and the mating plug connector in a connected state of the plug connector and the mating plug connector. The catch basket comprises a main body and a spring element having a first and second free end. The spring element is connected to the main body by torsion bridges such that the spring element is configured to tilt when the plug connector and mating plug connector are being connected, and such that the free ends are configured to press against the mating plug connector.

16 Claims, 4 Drawing Sheets

PLUG CONNECTOR AND PLUG CONNECTOR SYSTEM

CROSS REFERENCE TO RELATED APPLICATIONS

This application claims benefit to German Patent Application No. DE 10 2022 104 151.4, filed on Feb. 22, 2022, which is hereby incorporated by reference herein.

FIELD

The invention relates to a plug connector and to a plug connector system for transmitting high-frequency signals.

BACKGROUND

Plug connections, in particular coaxial plug connections, which typically comprise a socket contact and a pin contact, may be used for transmitting high-frequency signals. In plug connections for transmitting high-frequency signals, particularly in the automotive industry, it is crucial to guarantee a reliable connection between corresponding contacts in the long term. Fluctuations in the contacting may lead to diminished transmission properties or even to the contact being broken.

Document U.S. Pat. No. 7,070,440 B1 relates to a coaxial cable connector. The coaxial cable connector comprises an outer socket or contact, the socket being formed such that it can receive a plug (male plug connector) that fits the socket. The contact has a ring element having an inner annular surface. A first end of the ring element is dimensioned such that it can receive a dielectric element. Spring fingers extend from the ring element for receiving the plug through a second end.

The contacting by means of spring fingers or spring lugs, which are usually coupled to a main body on one side and produce contact at a free end on the pin side or plug side, at least has the drawback whereby it is possible that the spring lugs may remain deformed as a result of mechanical loading on the plug connector, in particular as a result of diagonal pulling. If the spring lugs remain deformed, this may lead to altered high-frequency properties or even to the contact being interrupted.

SUMMARY

In an embodiment, the present invention provides a plug connector for transmitting high-frequency signals. The plug connector includes an inner-conductor contact, an outer-conductor contact, and an insulator, which is arranged between the inner-conductor contact and the outer-conductor contact. A receptacle is formed by the outer-conductor contact and is configured to receive a mating plug connector to establish a connection between the plug connector and the mating plug connector. A catch basket is at least one of: formed by the outer-conductor contact, or arranged in the receptacle and is configured to produce contacting between the outer-conductor contact and the mating plug connector in a connected state of the plug connector and the mating plug connector. The catch basket comprises a main body and at least one spring element having a first and a second free end. The at least one spring element is connected to the main body by torsion bridges such that the at least one spring element is configured to tilt when the plug connector and mating plug connector are being connected, and such that the first and the second free end are configured to press against the mating plug connector

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
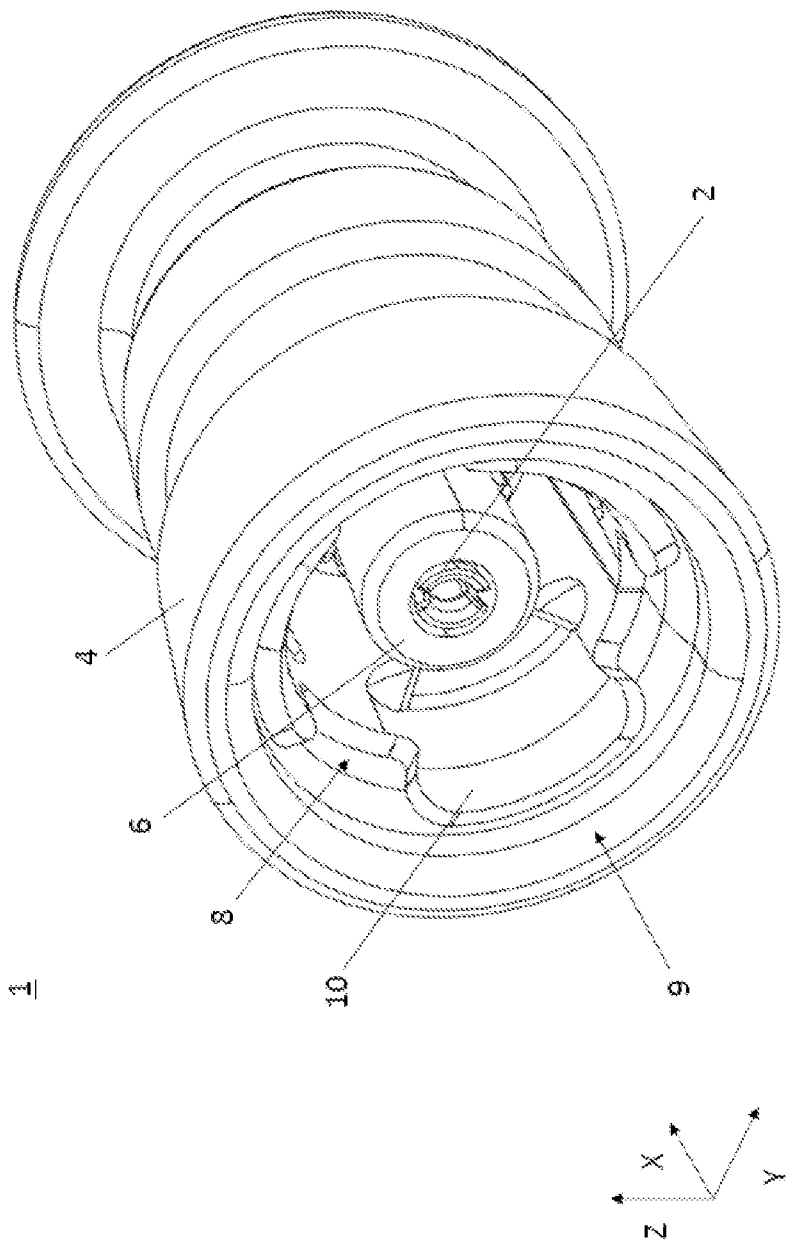
FIG. 1 is a perspective view of an embodiment of a plug connector.

In an embodiment, the present invention provides means for a plug connection having better contacting.

In particular, the means for a plug connection having better contacting is achieved according to an embodiment by a plug connector for transmitting high-frequency signals, having an inner-conductor contact, an outer-conductor contact, and an insulator, which is arranged between the inner-conductor contact and the outer-conductor contact, a receptacle, which is formed by the outer-conductor contact and in which there can be arranged a mating plug connector for establishing a connection between the plug connector and the mating plug connector, a catch basket, which is arranged in the receptacle and can produce contacting between the outer-conductor contact and the connected mating plug connector, the catch basket comprising a main body and at least one spring element having a first and a second free end, and the at least one spring element being connected to the main body by means of torsion bridges such that the at least one spring element can tilt when the plug connector and mating plug connector are being connected and such that the first and the second free end can press against the mating plug connector.

An advantage of embodiments of the present invention is that the plug connector only undergoes a slight loss, or no loss at all, of the contacting force even when mechanically loaded, in particular by transverse pulling forces. In particular, in an embodiment, the present invention obtains a constant contacting force since the first and the second free end, or the first and the second contact point, support each other as a result of the tilt movement. The tilting exerts a clamping action of the first and the second free end, or of the spring element, on the mating plug connector. In the process, the tilt movement also involves a rotational and/or pivoting movement. In addition, the two free ends increase the contact points on the mating plug connector and form a kind of redundancy.

Preferably, the catch basket comprises two opposing torsion bridges, preferably transversely to an insertion direction of the mating plug connector, on the at least one spring element and/or the torsion bridges are arranged on the at least one spring element in the middle in the insertion direction. Coupling the spring elements (also referred to as spring lugs) in the middle by means of torsion bridges provides more flexibility. An evenly distributed tilt movement is also obtained by using two opposing and/or centrally arranged torsion bridges. If the torsion bridges are oriented transversely, in particular perpendicularly, to the insertion or plugging direction of the mating plug connector, they can twist in the transverse direction or bring about torsion, which in turn enables or brings about a tilt movement or rotational movement of the at least one spring element in the plugging direction.

Preferably, the at least one spring element has a curved shape, in particular an S shape, in the insertion direction such that the at least one spring element can form at least a first and a second, separate contact point with the connected mating plug connector. Owing to the tilt movement or rotational movement of the central coupling by means of the torsion bridges, and owing to the curved shape of the spring elements, at least two spatially separate contact or contacting points are produced. Individual contact points form defined contacts that are largely constant in size, so consistent transmission properties can be guaranteed. In addition, smaller contact surfaces increase the pressure (or contact pressure) and thus improve the contacting.

Preferably, the plug connector further has a receiving opening through which the mating plug connector can be inserted into the receptacle, the first free end of the at least one spring element facing the receiving opening and inclining radially outward transversely to the insertion direction when a mating plug connector is not connected to the plug connector, and/or the second free end of the at least one spring element facing away from the receiving opening and inclining radially inward transversely to the insertion direction when a mating plug connector is not connected to the plug connector. The outwardly inclined shape of the first free end increases the size of the receiving region and makes it simpler for the mating plug connector to be received in the plug connector or catch basket. The inwardly inclined shape of the second free end forms a lever that is easy to actuate by way of the insertion movement of the mating plug connector. Overall, the structure provides more flexibility in the spring elements when the mating plug connector, which is preferably formed as a pin contact, is in a skew position. The risk of the spring elements being (permanently) deformed is low.

Preferably, the tilting of the at least one spring element involves a tilt movement about a tilt axis that is oriented transversely, in particular perpendicularly, to the insertion direction. The tilting produces a constant contacting force since the contact points support one another. In addition, both the first and the second free end simultaneously press against the mating plug connector, thereby making the contacting sturdier.

Preferably, the tilt movement covers a tilt angle of less than 20°, preferably less than 15°, and most preferably less than 10°, in relation to a longitudinal axis in the insertion direction. The tilt movement is substantially kept small. Owing to the small tilt angle, the torsion bridges are loaded to a lesser extent than with larger tilt angles. Since there is less loading, the durability of the torsion bridges and of the catch basket is increased overall.

Preferably, the catch basket is formed in one piece. The catch basket is preferably made of a metal material by punching and/or forming, and in particular is preferably manufactured in the form of a punched part or deep-drawn part. As a result of the production method, the catch basket is stable under load and large quantities can be manufactured cost-effectively. At the same time, the catch basket has a sturdy main body.

Preferably, the outer-conductor contact is closed such that the at least one spring element is supported against an inside of the outer-conductor contact. Since the at least one spring element is supported against the outer-conductor contact, outward warping, and in particular also overbending, of the spring element is prevented.

Preferably, the at least one spring element remains dimensionally stable when the plug connector and mating plug connector are being connected. The advantage created by the dimensional stability of the spring element is that the transmission properties of high-frequency signals remain substantially constant at the spring element and in particular are not impaired by mechanical deformation occurring on the spring element.

Preferably, the outer-conductor contact is formed as a catch basket. This is advantageous in that it is possible to generate direct contact, i.e., without a separate catch basket, between the outer conductor and the inserted mating plug connector in conjunction with the aforementioned advantages of a catch basket.

In addition, the above problems are solved in particular by a plug connector system according to an embodiment of the present invention for transmitting high-frequency signals, having a plug connector and a mating plug connector that can be connected to the plug connector.

Embodiment examples will be described in detail below with reference to the drawings.

FIG. 1 shows an embodiment example of a plug connector 1, which has at least an inner-conductor contact 2, an outer-conductor contact 4, and an insulator 6. The inner-conductor contact 2 and the outer-conductor contact 4 are used in order to transmit high-frequency signals to a mating plug connector 20 that can be connected to the plug connector 1, as is known. The insulator 6 is arranged between the inner-conductor contact 2 and the outer-conductor contact 4 and comprises a dielectric. The plug connector 1 is preferably formed as a female plug connector or socket.

The plug connector 1 shown in FIG. 1 may be enclosed by or arranged in a casing. The casing may have different shapes. During use, the plug connector 1 is secured to a free end of a conductor, such as a coaxial cable.

On one side, facing away from the securable conductor, the plug connector 1 has a receptacle 8. In the embodiment shown in FIG. 1, the receptacle 8 is formed by the outer-conductor contact 4. The receptacle 8 is configured to connect a matching mating plug connector 20 to the plug connector 1. Matching mating plug connectors 20 can be predetermined by means of the shape of the receptacle 8 and/or of the casing. In the embodiment example shown, the receptacle 8 and the mating plug connector 20 are cylindrical. In alternative embodiments, other geometries, e.g., rectangular, may be used for the receptacle 8 and the mating plug connector 20.

At its free end, the receptacle 8 has a receiving opening 9. The mating plug connector 20 can be inserted into the receptacle 8 through the receiving opening 9. The mating plug connector 20 can be inserted into the plug connector 1 or receptacle 8 as far as a stop. The stop may be formed on the casing, on the receiving opening 9, and/or on an opposite end of the receptacle 8 to the receiving opening. When the mating plug connector 20 abuts the stop, the mating plug connector 20 is completely connected to the plug connector 1. Upon connection, at least one part of the outer-conductor contact 4 encompasses the mating plug connector 20 externally. In the embodiment example being described, the receptacle 8 is dimensioned such that a catch basket 10 can be arranged between an inner wall of the outer-conductor contact 4 or receptacle 8 and the mating plug connector 20.

In the embodiment example shown in FIG. 1, the catch basket 10 is arranged inside the receptacle 8. The catch basket 10 is formed as an annular element and extends in the receptacle 8 along the inner wall of the receptacle 8. When the mating plug connector 20 is arranged in the plug connector 1 or receptacle 8, the catch basket 10 is located between the outer-conductor contact 4 and the mating plug connector 20. The catch basket 10 may be secured in the receptacle 8, in particular non-rotatably, by means of securing means. When the connection between the plug connector 1 and the mating plug connector 20 is released, the catch basket 10 remains in the receptacle 8.

In the embodiment example shown in FIG. 1, the outer-conductor contact 4 and the catch basket 10 are shown as separate components. In an alternative embodiment example, the outer-conductor contact 4 may be formed as the catch basket 10. The single-piece outer-conductor contact/catch basket component could be manufactured from a punched-bent part. In this embodiment example, the spring elements 12 could provide a supporting effect from the exterior by way of a surrounding casing, or said supporting effect could be omitted.

Figure 2:
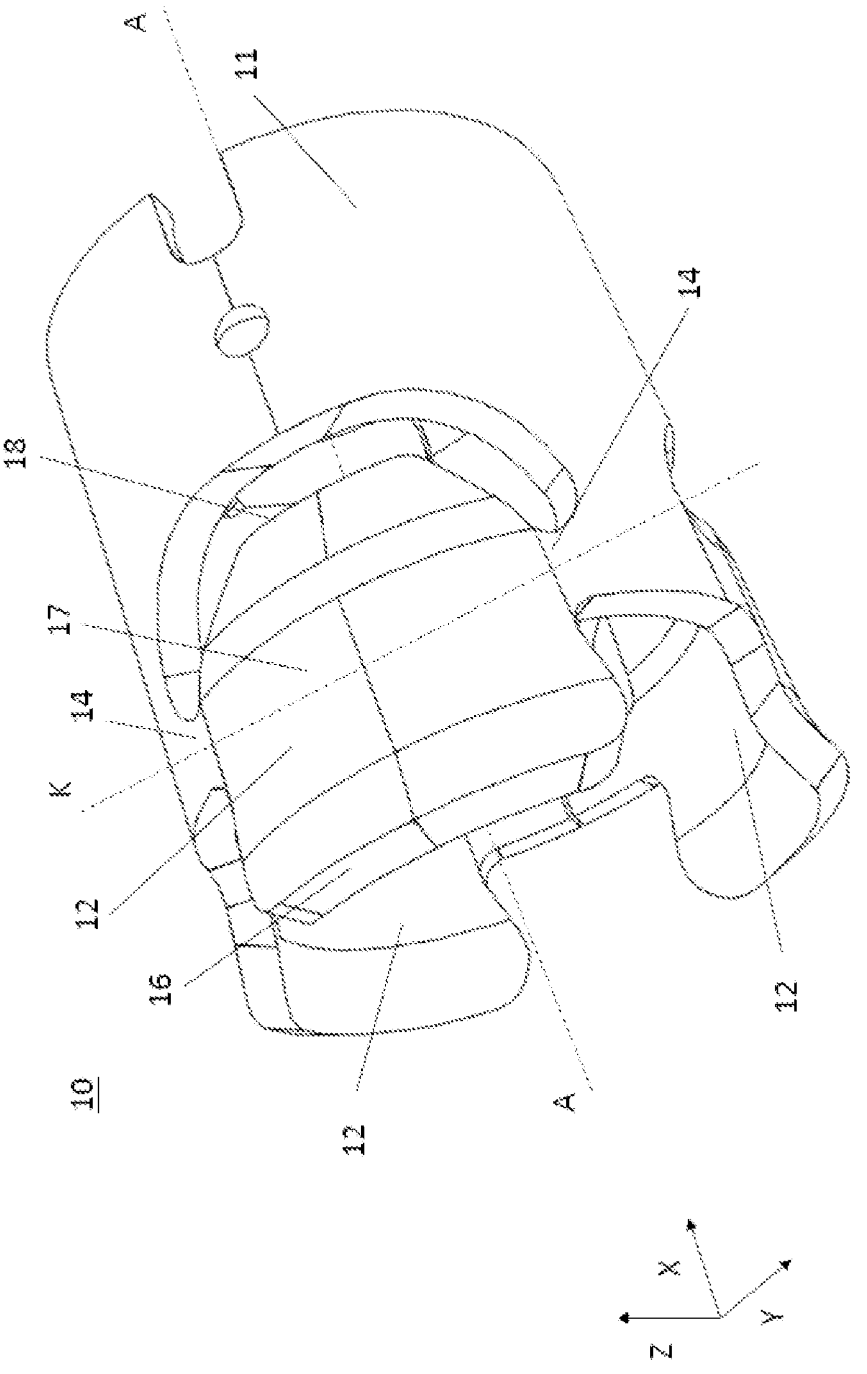
FIG. 2 is a perspective view of an embodiment of a catch basket.

FIG. 2 shows an embodiment example of a catch basket 10. The catch basket 10 has a main body 11 and at least one spring element 12 (three spring elements 12 in the embodiment shown). The number of spring elements 12 may vary. In alternative embodiment examples, the number preferably varies between one and four spring elements. The spring elements 12 are used to generate contact between the outer-conductor contact 4 and the connected mating plug connector 20. The spring elements 12 are movably mounted for the purpose of contacting. In particular, the spring elements 12 are secured to the main body 11 by means of torsion bridges 14. The torsion bridges 14 allow for twisting such that the spring elements 12 secured thereto can be tilted. Each spring element 12 is preferably secured to the main body 11 by means of two torsion bridges 14. The preferably two torsion bridges 14 are preferably oriented transversely to an insertion direction X of the mating plug connector 20 so that the spring elements 12 are able to tilt. The preferably two torsion bridges 14 form a tilt axis K about which each spring element 12 can tilt. The lift takes place in the radial direction in relation to a longitudinal axis A in the insertion direction X. The height of the lift of the tilt movement is determined from the travel by which the mating plug connector 20 moves each spring element 12 during connecting. To ensure a uniform lift movement or tilt movement, the torsion bridges 14 are arranged on each spring element 12 in the middle, in particular in the insertion direction X.

In the embodiment being described, the spring elements 12 have a curved shape, in particular an S shape, in the insertion direction X. Owing to the curved shape, it is possible that each spring element 12 can form at least a first and a second, separate contact point P1, P2 with the connected mating plug connector 20. In addition, the first free end 16 of each spring element 12, which first free end faces the receiving opening 9 when a mating plug connector 20 is not connected to the plug connector 1, inclines radially outward transversely to the insertion direction X, and/or the second free end 18 of each spring element 12, which second free end faces away from the receiving opening 9 when a mating plug connector 20 is not connected to the plug connector 1, inclines radially inward transversely to the insertion direction X. The outwardly inclined first free ends 16 thus make the receiving region for the mating plug connector 20 (not yet inserted or connected) larger, thereby simplifying insertion or connection. During connecting, the inwardly inclined second free ends 18 induce the tilt movement of the spring elements 12 and bring about the contacting of the first and second free ends 16, 18 with the mating plug connector 20.

In the initial state when a mating plug connector 20 is not inserted into the catch basket 10, an incline axis N, extending between the first and the second free end 16, 18 of a spring element 12, has an incline angle α. The incline angle α preferably covers less than 20°, more preferably less than 15°, and most preferably less than 10°, in relation to the longitudinal axis A in the insertion direction X (see FIG. 3).

The catch basket 10 with the main body 11, the at least one spring element 12, and the torsion bridges 14, is preferably formed in one piece. The catch basket 10 may be formed from a (zinc) diecast part or may be made of stainless steel or another material, preferably being formed by punching and/or forming. In particular, the spring elements 12 are formed to be dimensionally stable to ensure consistent contacting, i.e., the spring elements 12 do not change shape when the mating plug connector 20 is being connected to the plug connector 1.

Figure 3:
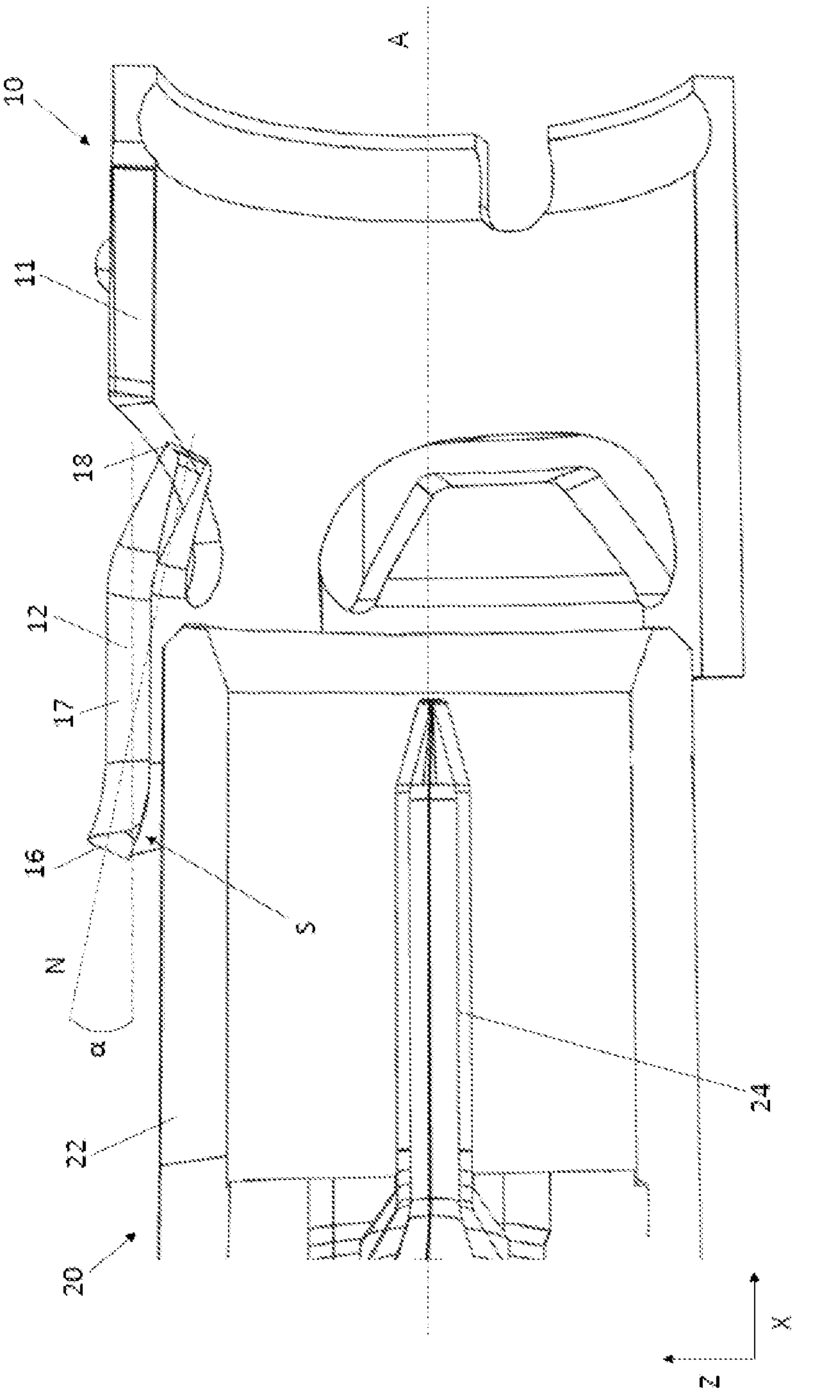
FIG. 3 is a cross-sectional view, in an insertion direction, of a mating plug connector and the catch basket from FIG. 2 at the start of an insertion operation.
Figure 4:
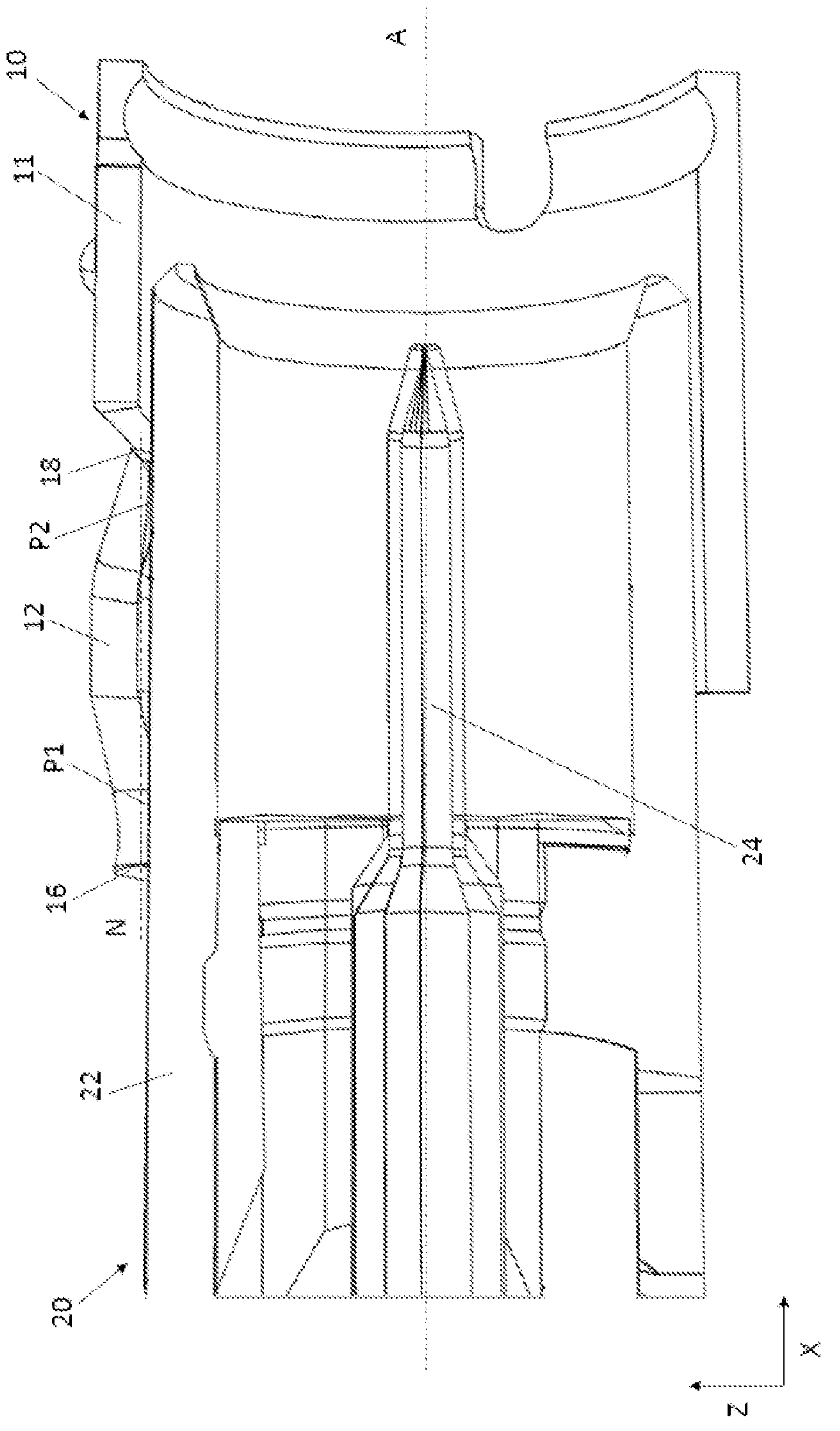
FIG. 4 shows the cross-sectional view from FIG. 3 in an advanced stage of the insertion operation.

FIGS. 3 and 4 show an embodiment of the operation for inserting or plugging the mating plug connector 20 into the catch basket 10. During connecting, the mating plug connector 20, the plug connector 1, or both is/are moved substantially in the insertion direction X such that the mating plug connector 20 enters the receptacle 8 through the receiving opening 9. The mating plug connector 20 in particular has an outer conductor 22 and an inner conductor 24, which may accordingly be connected to the outer-conductor contact 4 or inner-conductor contact 2 on the plug connector 1 in order to transmit high-frequency signals.

At the start of the insertion operation, as shown in FIG. 3, the spring elements 12 and their respective torsion bridges 14 are in the initial state. In the initial state, the torsion bridges 14 are not twisted, and each spring element 12 has an incline angle α. As described above, the incline angle α results from the curved shape of the spring elements 12. The outwardly curved shape of each first free end 16 makes the receiving region larger. In the case of an ideal movement of the mating plug connector 20 in the insertion direction X on the longitudinal axis A, the first free ends 16 form a gap S from the mating plug connector 20. This gap S also allows the mating plug connector 20 to assume a skew position in relation to the longitudinal axis A at the start of the insertion operation. The shape of the spring elements 12 can then align the mating plug connector 20 when it is inserted further along the longitudinal axis A. The mating plug connector 20 can be aligned along the longitudinal axis A substantially by a middle portion 17 on the spring elements 12. In the initial position, and unless the mating plug connector 20 has already contacted or moved the second free ends 18, the middle portions 17 of the spring elements 12 are aligned in parallel with the longitudinal axis A.

In an advanced stage of the insertion operation (see FIG. 4), the mating plug connector 20 comes into contact with the second free ends 18 of the spring elements 12. The second free ends 18 incline radially inward in relation to the longitudinal axis A such that they protrude into a region in which the mating plug connector 20 is to be positioned. When the mating plug connector 20 moves, in particular presses, against the second free ends 18, they are pushed radially outward. Owing to the properties, or mobility, of the torsion bridges 14, the torsion bridges 14 are twisted and each spring element 12 tilts radially outward by its second free end 18. The spring elements 12 are not mechanically deformed. At the same time, the tilt movement moves the first free ends 16 of the spring elements 12 radially inward in relation to the longitudinal axis A.

The second free ends 18 are moved so far radially outward that the mating plug connector 20 can be arranged in its entirety inside the catch basket 10. Any further radially outward movement of the second free ends 18 is prevented by the first free ends 16, which have come into contact with the mating plug connector 20 as a result of the tilt movement; this is because the first free ends 16 cannot be tilted any further inward owing to the mating plug connector 20. As a result, the first and second free ends 16, 18 both press against the mating plug connector 20. The pressure force of the first free ends 16 is generated by the tilt movement, and the pressure force of the second free ends 18 is generated by the deflecting out of the initial position, and by an associated restoring force of the torsion bridges 14.

Owing to the curved shape of the spring elements 12, two spatially separate contact points P1, P2 with the mating plug connector 20 are produced on each spring element 12. A first contact point P1 is formed at the first free ends 16, and a second contact point P2 is formed at the second free ends 18. The distance between the contact points P1, P2 and their size can be predetermined by the curved shape and the length of the spring elements 12. Furthermore, the gap S is closed in the advanced stage so as to prevent foreign matter from entering. The incline axis N extends substantially in parallel with the longitudinal axis A in the advanced stage.

When the connection is released, the spring elements 12 return to their initial position owing to the restoring force of the torsion bridges 14. The restoring force of the torsion bridges 14 can be fixed by way of the shape, in particular the width, and the material thereof.

The plug connector 1 and the matching mating plug connector 20 form a plug connector system for transmitting high-frequency signals. The plug connector system is preferably used for data transmission in vehicles.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
2 Inner-conductor contact
4 Outer-conductor contact
6 Insulator
8 Receptacle
9 Receiving opening
10 Catch basket
11 Main body
12 Spring element
14 Torsion bridge
16 First free end
17 Middle portion
18 Second free end
20 Mating plug connector
22 Outer conductor
24 Inner conductor
A Longitudinal axis
K Tilt axis
N Incline axis
P1 First contact point
P2 Second contact point
S Gap
X Insertion direction
Y Second direction
Z Third direction
α Incline angle

What is claimed is:

1. A plug connector for transmitting high-frequency signals, the plug connector comprising:

an inner-conductor contact, an outer-conductor contact, and an insulator, which is arranged between the inner-conductor contact and the outer-conductor contact;

a receptacle, which is formed by the outer-conductor contact and is configured to receive a mating plug connector to establish a connection between the plug connector and the mating plug connector; and a catch basket, which is arranged in the receptacle and is configured to produce contacting between the outer-conductor contact and the mating plug connector in a connected state of the plug connector and the mating plug connector, wherein the catch basket comprises a main body and at least one spring element having a first and a second free end, and wherein the at least one spring element is connected to the main body by torsion bridges such that the at least one spring element is configured to tilt when the plug connector and mating plug connector are being connected, and such that the first and the second free end are configured to press against the mating plug connector.

2. The plug connector according to claim 1, wherein the catch basket comprises two opposing torsion bridges arranged on the at least one spring element.

3. The plug connector according to claim 2, wherein the two opposing torsion bridges are arranged transversely to an insertion direction and/or in a middle of the insertion direction.

4. The plug connector according to claim 1, wherein the at least one spring element has a curved shape in an insertion direction such that the at least one spring element is configured to form at least a first and a second, separate contact point with the connected mating plug connector.

5. The plug connector according to claim 4, wherein the at least one spring element is S-shaped.

6. The plug connector according to claim 1, further comprising a receiving opening through which the mating plug connector is insertable into the receptacle, wherein:

the first free end of the at least one spring element faces the receiving opening and inclines radially outward transversely to an insertion direction in a disconnected state of the plug connector and the mating plug connector; and/or the second free end of the at least one spring element faces away from the receiving opening and inclines radially inward transversely to the insertion direction in the disconnected state of the plug connector and the mating plug connector.

7. The plug connector according to claim 1, wherein the at least one spring element is configured to perform the tilt by a tilt movement about a tilt axis that is oriented transversely to an insertion direction.

8. The plug connector according to claim 7, wherein the tilt axis is oriented perpendicularly to the insertion direction.

9. The plug connector according to claim 7, wherein the tilt movement covers a tilt angle of less than 20° in relation to a longitudinal axis in the insertion direction.

10. The plug connector according to claim 7, wherein the tilt movement covers a tilt angle of less than 15° in relation to a longitudinal axis in the insertion direction.

11. The plug connector according to claim 7, wherein the tilt movement covers a tilt angle of less than 10° in relation to a longitudinal axis in the insertion direction.

12. The plug connector according to claim 1, wherein the catch basket is formed in one piece.

13. The plug connector according to claim 1, wherein the outer-conductor contact is closed such that the at least one spring element is supported against an inside of the outer-conductor contact.

14. The plug connector according to claim 1, wherein the at least one spring element remains dimensionally stable when the plug connector and mating plug connector are being connected.

15. A plug connector system for transmitting high-frequency signals, the plug connector system comprising the connector according to claim 1, and the mating plug connector that is connectable to the plug connector.

16. A plug connector for transmitting high-frequency signals, the plug connector comprising:

an inner-conductor contact, an outer-conductor contact, and an insulator, which is arranged between the inner-conductor contact and the outer-conductor contact;

a receptacle, which is configured to receive a mating plug connector to establish a connection between the plug connector and the mating plug connector; and a catch basket, wherein the catch basket comprises a main body and at least one spring element having a first and a second free end, and wherein the at least one spring element is connected to the main body by torsion bridges such that the at least one spring element is configured to tilt when the plug connector and mating plug connector are being connected, and such that the first and the second free end are configured to press against the mating plug connector.

* * * * *